(12) United States Patent
Bennett et al.

(10) Patent No.: US 7,802,652 B2
(45) Date of Patent: Sep. 28, 2010

(54) SERVICING STATION FOR TRACTOR TRAILER TRUCKS

(75) Inventors: Ronald W. Bennett, Florence, SC (US); Ellie H. MacDonald, Timmonsville, SC (US); James A. Ackerman, Mullins, SC (US)

(73) Assignee: Aluminum Ladder Company, Florence, SC (US)

( * ) Notice: Subject to any disclaimer, the term of this patent is extended or adjusted under 35 U.S.C. 154(b) by 1234 days.

(21) Appl. No.: 11/374,637

(22) Filed: Mar. 13, 2006

(65) Prior Publication Data

US 2007/0209873 A1 Sep. 13, 2007

(51) Int. Cl.
*E04G 3/28* (2006.01)
(52) U.S. Cl. .................... 182/39; 182/130
(58) Field of Classification Search ......... 182/130–132, 182/36, 115
See application file for complete search history.

(56) References Cited

U.S. PATENT DOCUMENTS

| | | | | | |
|---|---|---|---|---|---|
| 79,399 | A | * | 6/1868 | Rowan | 182/13 |
| 250,901 | A | * | 12/1881 | Dunn | 182/36 |
| 259,622 | A | * | 6/1882 | Willians | 182/12 |
| 316,969 | A | * | 5/1885 | High | 182/36 |
| 480,518 | A | * | 8/1892 | Roberts | 182/36 |
| 1,094,213 | A | * | 4/1914 | Jones | 182/12 |
| 2,361,290 | A | * | 10/1944 | Herold | 188/41 |
| 2,523,113 | A | * | 9/1950 | Hanna et al. | 105/210 |
| 3,072,130 | A | * | 1/1963 | Grabenhorst | 134/100.1 |
| 3,255,681 | A | * | 6/1966 | Heltzel et al. | 404/101 |
| 4,294,332 | A | * | 10/1981 | Ready | 182/141 |
| 4,572,328 | A | * | 2/1986 | Benko | 182/1 |
| 4,600,817 | A | | 7/1986 | Hackenberg | 191/12 |
| 4,679,657 | A | * | 7/1987 | Bennett et al. | 182/113 |
| 4,776,429 | A | * | 10/1988 | Osborn | 182/144 |
| 4,913,357 | A | * | 4/1990 | Bolyard et al. | 239/751 |
| 5,027,922 | A | * | 7/1991 | Benko et al. | 182/113 |
| 5,042,612 | A | * | 8/1991 | Bennett et al. | 182/1 |
| 5,048,640 | A | * | 9/1991 | McConville et al. | 182/36 |
| 5,392,878 | A | * | 2/1995 | Bennett et al. | 182/115 |
| 5,445,569 | A | | 8/1995 | Blase | 474/145 |
| 5,860,274 | A | | 1/1999 | Saleh et al. | 59/78.1 |
| 6,502,709 | B1 | * | 1/2003 | Parker | 212/328 |
| 6,782,665 | B2 | * | 8/2004 | Fahrion | 52/64 |
| 7,140,467 | B2 | * | 11/2006 | Cook | 182/143 |
| 2004/0045768 | A1 | * | 3/2004 | Puszkiewicz et al. | 182/69.5 |
| 2004/0262949 | A1 | * | 12/2004 | Rasmussen | 296/158 |
| 2005/0028704 | A1 | * | 2/2005 | Traubenkraut et al. | 104/111 |
| 2006/0054392 | A1 | * | 3/2006 | MacDonald et al. | 182/113 |
| 2007/0125600 | A1 | * | 6/2007 | Bennett et al. | 182/179.1 |
| 2007/0209873 | A1 | * | 9/2007 | Bennett et al. | 182/179.1 |
| 2008/0112785 | A1 | * | 5/2008 | Caparros | 414/468 |

* cited by examiner

*Primary Examiner*—Katherine W Mitchell
*Assistant Examiner*—Candace L. Bradford
(74) *Attorney, Agent, or Firm*—John B. Hardaway, III; Nexsen Pruet, LLC

(57) ABSTRACT

A servicing station for flatbeds includes a workers platform which is driven along one lateral side of the flatbed by an electric motor driving a spur gear in mesh with a rack on an overhead beam positioned sufficiently high to not interfere with lift truck loading and unloading of the flatbed. The electric motor is supplied electrical power through a power chain positioned on the overhead beam.

9 Claims, 3 Drawing Sheets

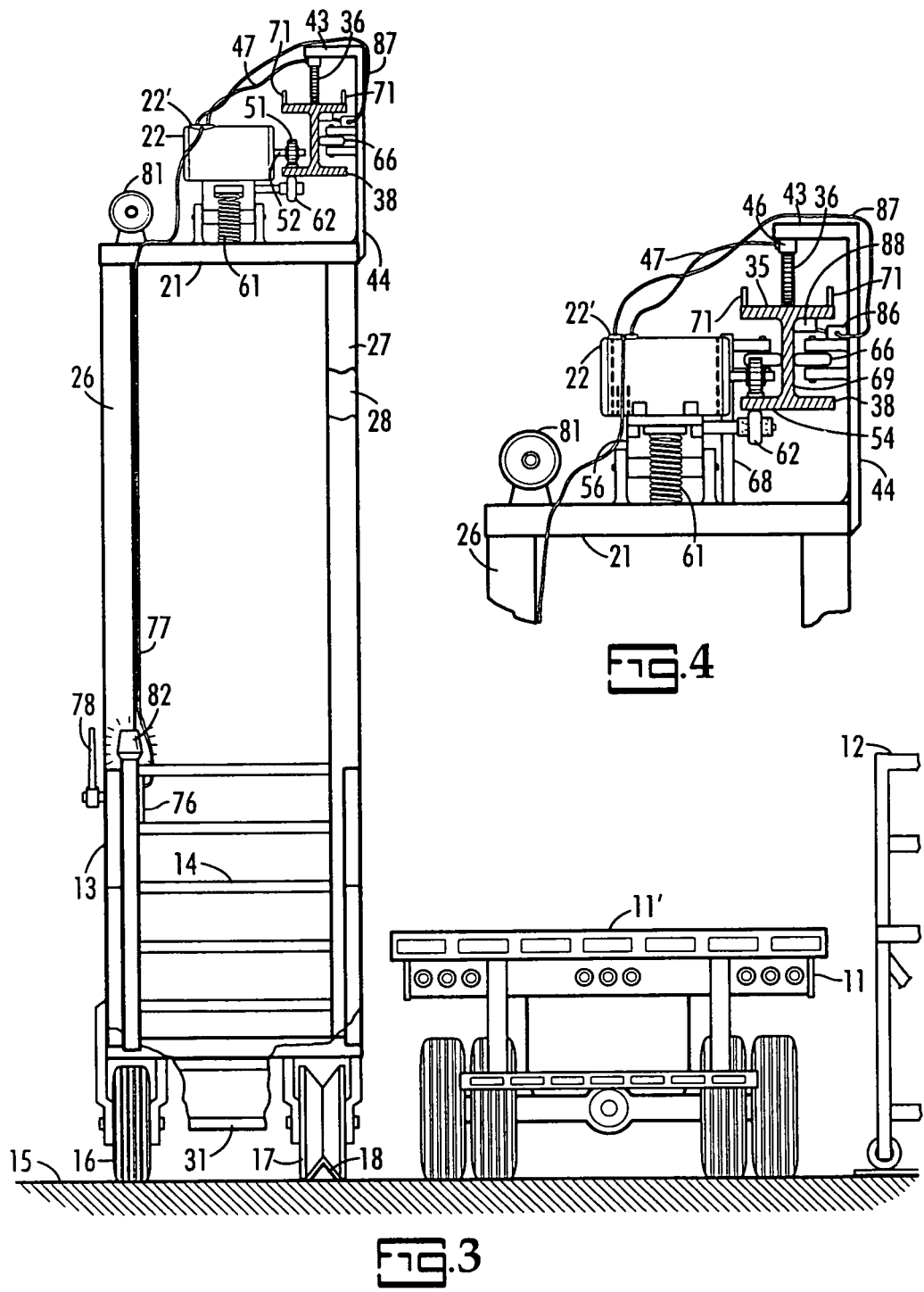

SERVICING STATION FOR TRACTOR TRAILER TRUCKS

CROSS REFERENCE TO RELATED APPLICATIONS

The content of co-pending U.S. patent application Ser. No. 11/295,127 filed Dec. 5, 2005 for an Access Platform for Flatbeds is hereby incorporated by reference.

BACKGROUND OF THE INVENTION

Tractor trailer trucks move a major portion of the commercial goods including raw materials, semi finished goods, components and finished goods. Worker access to the trailers of such trucks is necessary for loading, securing, tarping, inspection and unloading. Servicing stations with platforms for access to one or both lateral sides of flatbed trailers have been designed including laterally shiftable platforms as described in the before mentioned related patent application. Having access platforms at both sides of the flatbed truck or trailer is desirable for fast efficient servicing; however if the flatbed truck or trailer is to be loaded or unloaded by lift trucks, it would usually be more efficient to do such loading and unloading at a lateral side of the flatbed rather than at its rear. Access at one lateral side of the flatbed for lift truck loading and/or unloading can be provided at a servicing station if the servicing station does not have a worker access platform extending along that side. However, worker access to that side is still desirable. For instance when tarping a load, or removing the tarping from a load, it is more efficient if worker access is provided on both lateral sides of the flatbed.

SUMMARY OF THE INVENTION

A servicing station for tractor trailer trucks or flatbeds includes a wheeled servicing platform at one lateral side of a flatbed which is movable in a fore and aft path; thereby providing worker access to selected places at that lateral side of the flatbed. The wheeled platform can be moved beyond one longitudinal end of the flatbed so as to provide unencumbered lift truck access to the mentioned lateral side of the flatbed. The mobile servicing platform is guided by a track and is propelled by an electric motor driving a spur gear engaging a rack on an overhead horizontal beam extending parallel to the truck. The overhead beam is supported at its longitudinally opposite ends by vertical columns or posts spaced horizontally apart a greater distance than the length of the flatbed trailer being serviced. Power is supplied to the electric motor by a power chain positioned on the top side of the horizontal beam.

BRIEF DESCRIPTION OF THE DRAWINGS

The invention is illustrated in the accompanying drawings, in which:

FIG. 3 is a rear view taken on line 3-3 in FIG. 1 with parts broken away for illustration purposes;

FIG. 4 is an enlarged rear view of the upper end of the servicing platform;

DETAILED DESCRIPTION OF THE INVENTION

Figure 1:
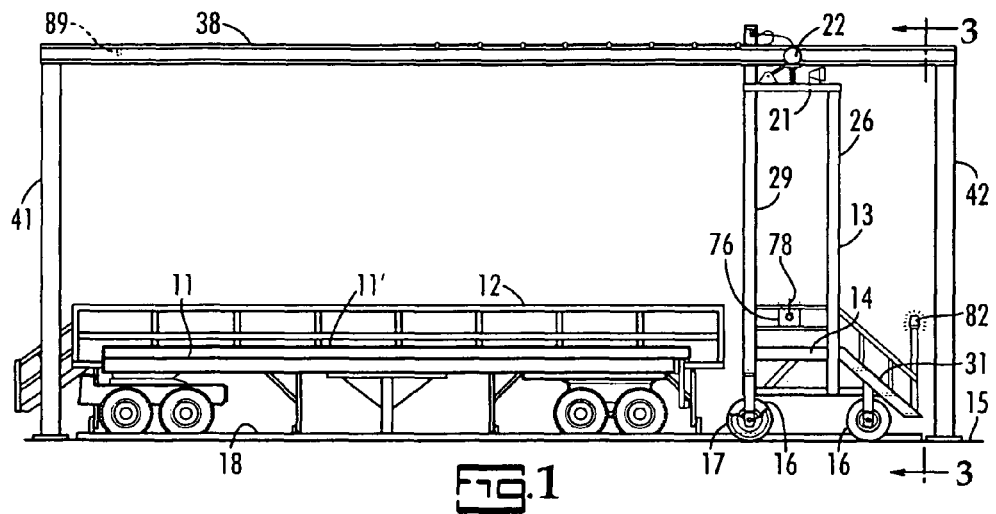
FIG. 1 is a side view of the servicing station and a flatbed trailer.
Figure 2:
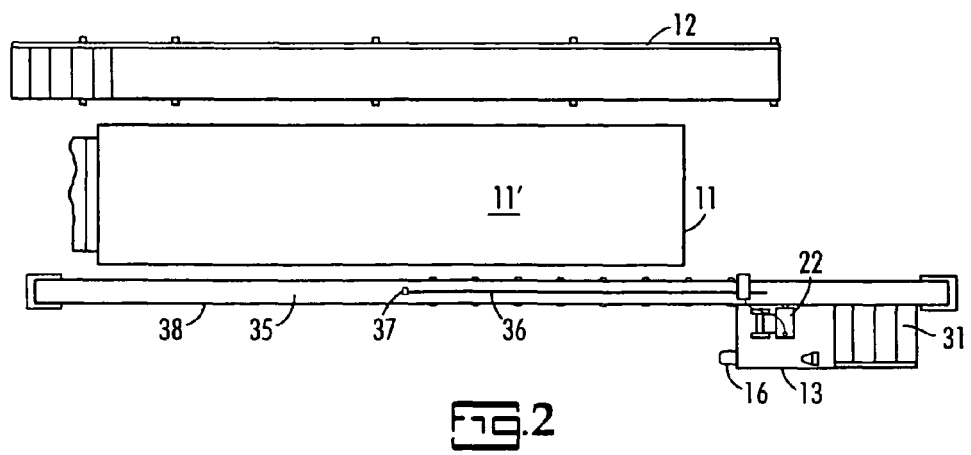
FIG. 2 is a top view of the servicing station and the flatbed trailer shown in FIG. 1.
Figure 5:
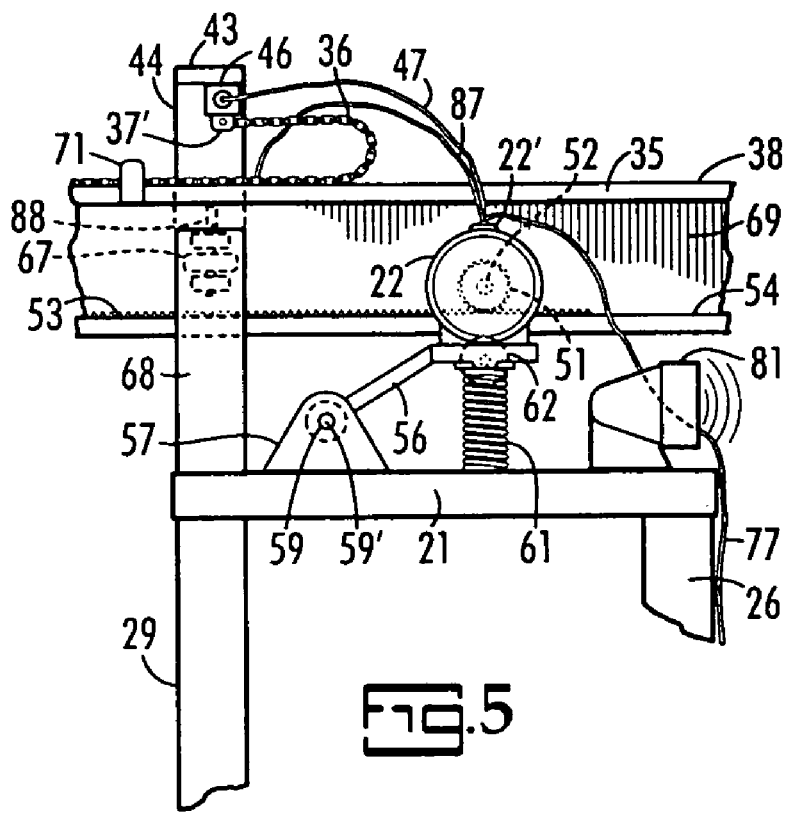
FIG. 5 is a partial side view showing the upper end of the servicing platform.
Figure 6:
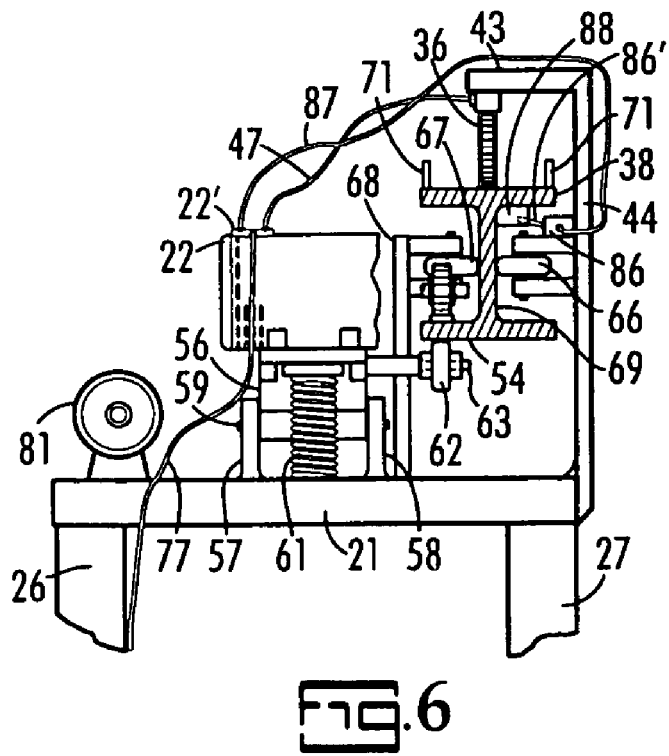
FIG. 6 is a view similar to FIG. 4 with parts broken away for illustration purposes.

As shown in the accompanying drawings, the servicing station for servicing the flatbed trailer 11 includes a wheeled laterally shiftable workers platform 12, at the right side of the trailer 11, made in the form shown in the before mentioned related U.S. patent application Ser. No. 11/295,127, and a longitudinally movable worker's servicing platform 13, on the left side of the trailer 11, having a deck 14 at the same height as the deck 11' of the trailer 11. The platform 13 is supported by a pair of flat tread wheels 16 at its laterally outer side which travel on a flat fixed horizontal support base 15, and by a pair of V grooved wheels 17 at its laterally inner side which run on and are guided by a longitudinal horizontal inverted V section track 18. An overhead electric motor support structure includes a floor 21 on which an electric motor 22 is mounted, the floor 21 being supported by four pillars 26, 27, 28 and 29 extending upwardly from the corners of the deck 14. A rear stairway 31 provides access to the deck 14 of the traveling workers platform 13.

Electric power is supplied to the electric motor 22 by an elongated electric energy guiding or power chain 36 secured at one end 37 to the upper side of the flange 35 of an I-beam 38 supported at longitudinally opposite ends by vertical posts or support columns 41, 42 at one lateral side of the trailer 11. The energy guiding chain may be of the type shown in U.S. Pat. No. 5,445,569 or a similar commercially available E-chain marketed by Igus Spritzgussteile fur die Industrie GmbH, of Köln, Germany. The other end 37' of the energy guiding chain 36 is secured to an energy supply station 46 mounted on an arm 43 extending laterally from the top of a vertical support member 44 rigidly secured at its lower end to the top of the traveling workers platform 13. Electric power is supplied to the end 37 of the chain 36 in a conventional manner. An electric lead 47 connects the end 46 of the energy guiding chain 36 to a control module 22' on the motor 22. A spur gear 51 is nonrotatably and coaxially secured to an output shaft 52 of the motor 22 and it meshes with a gear rack 53 secured to the top side of a bottom flange 54 of the I-beam 38, which extends laterally outward from the web 69 of the I-beam 38. The motor 22 is mounted on a support 56 pivotally connected to upstanding brackets 58, 58 on the floor 21 by a laterally extending horizontal pin 59, where axis is parallel to and spaced longitudinally from the axis of the motor shaft 52 and, as illustrated, the pivotable support 56 and the motor 22 are supported in counterbalance fashion by a coil spring 61 between the floor 21 and the support 56. A roller 62, in vertical upward thrust transmitting relation with the underside of the bottom flange 54 of the I-beam 38, is rotatably mounted on the support 56 on a laterally extending horizontal axis 63. The upward spring bias of the support 56 for the motor 22 and the roller 62 keep the spur gear 51 in proper mesh with the rack 53 with the spring 61 compensating for any sag that may occur in the I-beam 38 or unevenness that may exist in support base or in the height of the inverted V track 18. The pivotable support 56 and spring 61 could be replaced by a cantilever mounted left spring, not shown.

A pair of laterally oppositely acting guide rollers 66, 67 are mounted on vertical axes on the support member 44 and a support member 68, respectively, and are in rolling guided relation to laterally opposite sides of the vertical web 69 of the I-beam 38. The guide rollers 66, 67 insure lateral stability and proper tracking of the traveling workers platform 13 as well as proper alignment of the power chain 36 with the I-beam 38.

Upstanding guide tabs 71 secured at their lower ends at regular intervals to the laterally outer edges of the upper flange 35 of the I-beam 38 maintain the power chain on top of the upper flange 35 of the I-beam 38. The I-beam 38 is sufficiently high so as to not to interfere with side loading and unloading of the trailer 11 by one or more lift trucks. For instance, the I-beam 38 may be 25 feet above the base 15.

The electric motor 22 is a reversible motor and it is controlled by a manually operable controller 76 which is mounted on the laterally outer side of the traveling platform 13. The controller 76 is connected to a controller module 22' of the motor 22 by an electrical lead 77 and the controller 76 is adjusted by a pivotable control lever 78 having a straight up neutral position and forward and reverse positions in which lever 78 is pivoted in opposite directions of rotation from the illustrated neutral position. A travel limit mechanism is provided to prevent over travel in forward and reverse directions. The travel limit mechanism includes a toggle switch 86 mounted on the vertical support member 44. The toggle switch 86 is connected to the control module 22' of the motor by a lead 87. The toggle switch 86 includes a pivot arm 86' engageable with laterally inward projecting abutments 88, 89 rigidly mounted on the underside of the laterally inward projecting portion of the upper flange 35 of the I-beam 38. The traveling workers platform 13 is equipped with a horn 81 and a flashing light 82; which are both energized when the control lever is moved from its neutral position to cause the motor 22 to drive the traveling platform 13 in either direction, thereby providing warning to workers at the servicing station.

What is claimed is:

1. A servicing station for tractor trailer trucks having a flatbed trailer, comprising:
    a fixed horizontal support base;
    a pair of vertical support columns mounted on said support base and spaced horizontally from one another a distance at least as great as the length of said trailer said columns extending upwardly above the height of said trailer a sufficient distance to avoid interference with loading and unloading of said trailer at one of its laterally opposite sides by a lift truck,
    a horizontally disposed I-beam having longitudinally opposite ends supported on said columns, respectively; said I-beam having upper and lower parallel horizontal flanges centrally interconnected by a longitudinally extending vertical web having laterally opposite inner and outer sides,
    a gear rack on top of said lower flange at the laterally outer side of said vertical web,
    a longitudinally extending track on said support base parallel to and beneath said I-beam,
    a servicing platform having
        a horizontal workers deck disposed at the height of a flatbed trailer of a tractor trailer truck,
        a first pair of longitudinally spaced wheels mounted on and guided by said track,
        a second pair of longitudinally spaced wheels engaging said support base and spaced laterally from said first pair of wheels,
        a stairway secured to said servicing platform providing human access to said deck,
        an electric motor support structure extending upwardly from said deck,
        an electric motor mounted on said electric motor support structure having a horizontal output shaft,
        a spur gear driven by said output shaft, said spur gear being in mesh with said rack, and
        an electric supply station on said servicing platform positioned above said I-beam and connected in electrical supply relation to said motor, and
    an elongated electrical energy guiding chain having one end secured to the top of said I-beam and its other end secured to said electric supply station.

2. The servicing station of claim 1 having a roller mounted on said electric motor support structure in vertical thrust transmitting relation with the underside of said I-beam.

3. The servicing station of claim 2 having a pair of guide rollers rotatably mounted on said motor support structure on vertical axes and in rolling guided relation to laterally opposite sides of said web of said I-beam.

4. The servicing station of claim 2 wherein said motor is secured to a biased support mounted on said electric motor support.

5. The servicing station of claim 4 wherein said biased support includes counterbalance spring acting in upward biasing relation to said motor.

6. The servicing station of claim 1 wherein said track has an inverted V shaped in cross section.

7. The servicing station of claim 1 having a signal light on said servicing platform which flashes when said platform is moving on said track.

8. The servicing platform of claim 1 having a horn which emits a warning noise when said platform is moving on said track.

9. The servicing platform of claim 1 having a travel limit mechanism including a toggle switch mounted on said electric motor support structure including a toggle and longitudinally spaced abutments on said I-beam with which said toggle engages to stop travel of said servicing platform.

* * * * *